Nov. 16, 1937.    P. A. JENSEN    2,099,398
FASTENING DEVICE
Filed Feb. 18, 1937
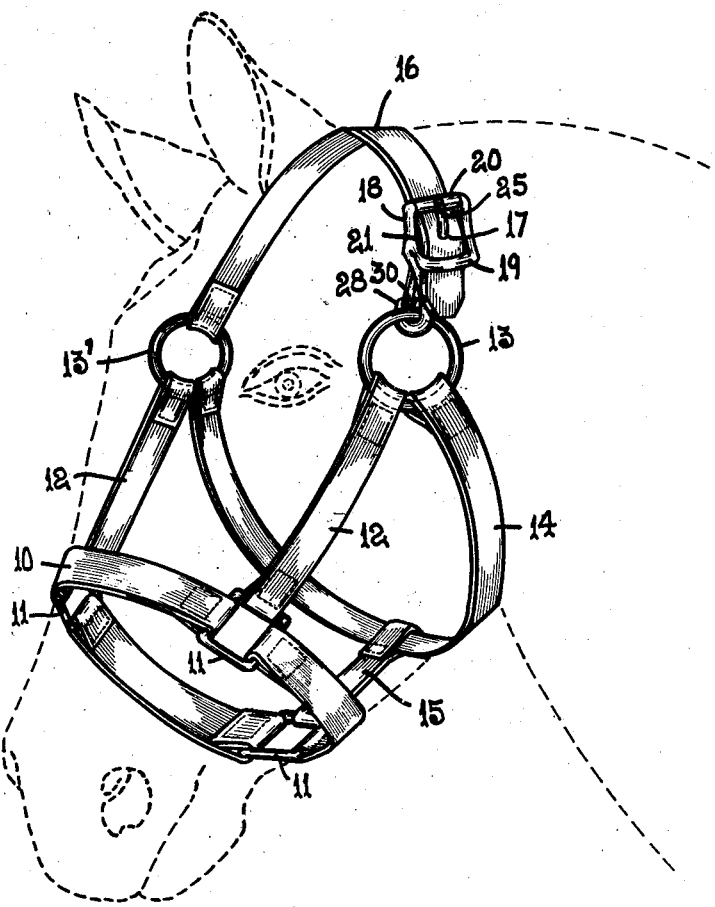
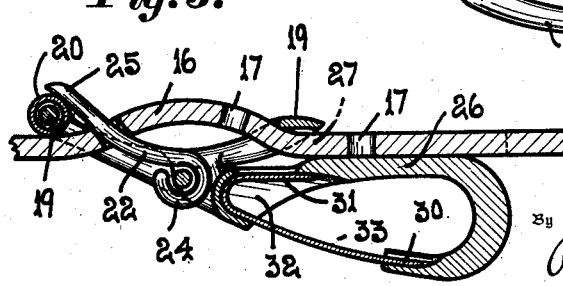
Inventor
P. A. Jensen
By Arthur H. Sturges
Attorney Patented Nov. 16, 1937

2,099,398

UNITED STATES PATENT OFFICE 2,099,398

FASTENING DEVICE

Peter A. Jensen, Wall Lake, Iowa

Application February 18, 1937, Serial No. 126,371

1 Claim. (Cl. 24—73)

This invention relates to fastening devices and more particularly to buckles and snap-hooks and has for an object to provide a buckle so rigidly and cooperatively assembled with a snap-hook that a strap when attached to the buckle may be readily adjusted without detaching the hook from an object such as a metal ring or the like.

Another object of the invention is to provide a buckle and snap hook assembly cooperatively arranged for attaching a strap to the buckle in such a manner that the mouth of the hook is disposed and held towards an object which the strap encircles for disposing the snap between said object and the free end of the strap, whereby the free end of the strap does not interfere with the resilient tang of the hook during attachment or detachment of the hook with respect to a ring or the like to which said strap is permanently attached or associated.

A further object is to provide a cooperative assembly of snap, hook and buckle for harness, linemen's life belts and the like.

A particular object of the invention is to provide a halter having a crown-strap which may be removed from the head of an animal without passing said crown strap over the ears of the animal, said halter having a cooperatively assembled snap hook and buckle for receiving the free end of said crown strap.

Other and further objects and advantages of the invention will be understood from the following detailed description thereof, reference being had to the accompanying drawing in which:

Figure 1 is a perspective view of a halter embodying the present invention.

Figure 2 is a perspective view of a buckle and integral snap hook employed.

Figure 3 is a longitudinal, sectional view of said buckle and hook cooperatively assembled with respect to a strap.

Referring now to the drawing for a more particular description, 10 indicates a band adapted to encircle the nose of an animal such as a horse, mule or the like. The band 10 may include three spaced apart metal rings 11 which are square in plan.

Oppositely disposed cheek-bands 12 are secured at their ends to the nose-band 12 or more particularly to respective rings 11 thereof. The other ends of said cheek-bands are each secured respectively to a metal ring 13' and a like ring 13 which are preferably circular in plan and adapted to be disposed at opposite sides of the head of an animal in use.

The halter further includes a throat-band 14 having ends which are secured to respective rings 13' and 13. A lead-up-band 15 extends from and between the nose and throat bands, the heretofore mentioned parts being suitably secured together by any suitable means such as stitching or riveting.

A crown-strap 16 is adapted to extend over the head of an animal behind the ears or horns thereof, said crown-strap having an end permanently secured to the ring 13', its other or free end being provided with a plurality of spaced apart apertures 17.

Means are provided for attaching the free end of the crown-strap to the other ring 13 for securing the crown-strap and halter to the head of an animal in a removable manner, said means including an open buckle frame formed of metal which is of rectangular configuration in plan and preferably elongated, said frame also preferably being of arcuate segmental configuration in side elevation as shown in Figure 3 and consisting of oppositely disposed side frame members 18 and end frame members 19, one of the latter preferably being provided with a roller sleeve 20 as best shown in Figure 3.

A bar 21 is formed integral with the frame and extends from and between the oppositely disposed sides 18 thereof.

A tongue pin 22 is pivotally attached at one of its ends to the bar 21, the latter being provided with an aperture 23 for receiving the bent end 24 of said pin as shown in Figure 3. The tongue pin is preferably secured to said bar midway between the side frame members 18 and the free end 25 of the tongue pin is adapted to have swinging movements in parallelism with the side frame portions 18 extending from said bar to the roller 20 at times.

The hook portion of the assembly includes a main body portion 26 formed integral with the bar 21 for maintaining it rigid with respect to the buckle, said body portion extending beyond the end portion of the frame which is oppositely disposed with respect to the roller 20, said body portion being spaced from said end as best shown in Figure 3, said space 27 having a distance of approximately the thickness of the crown-strap 16.

The body portion 26 is bent away from the said space 27 and extends in substantial parallelism therewith, the end 28 of the hook being flared as shown in Figure 2 and provided with a recess 29 for receiving the free end 30 of a resilient tang formed of spring metal.

The other end 31 of the tang is bent to a substantially U-shape configuration in side elevation and is received in a socket 32 of complementary shape provided partially in the main body portion 26 of the hook and the bar 21 as best shown in Figure 3.

The inherent resiliency of the U-shaped end of the tang holds it operatively attached to the hook whereby the main body portion of the tang normally maintains the mouth 33 of the hook closed, said end 30 of the tang being normally urged to a closed position, abutting against the end 28 of the hook, and adapted to move towards the main body portion 26 of the hook for fastening a ring such as the ring 13 to the hook.

The crown-strap 16 extends through the buckle frame and between the bar 21 and the end portions 19 thereof, the tongue pin being releasably engaged through one of the apertures 17 of the strap for securing the strap to the buckle frame.

The free end of the strap 16 extends through the said cooperative space 27 for disposing the free end of the strap away from the mouth of the hook for permitting movement of said tang without interference from the strap during an attachment of the hook to the ring 13.

As thus described it will be understood that the nose-band 10 may be applied to encircle the nose of an animal and the crown-strap 16 disposed behind the animal's ears without disturbing the latter which is of particular advantage with mules, the latter type of animal being very sensitive and disagreeably responsive to halters which necessitate bending the ears of an animal for securing a halter to his head.

The crown-strap 16 having been positioned as above described, the hook may be attached to the halter ring 13 readily without interference from the free end of the strap, said hook being disposed between the strap and the head of the animal and the length of the halter strap may be adjusted or shortened without detaching the hook from the ring.

Similarly the cooperative assembly functions to advantage in instances where it is applied to other harness parts, linemen's belts or the like, said belt being similar to the crown-strap 16.

What I claim and desire to secure by Letters Patent is:

A fastening device comprising an open frame of elongated rectangular configuration in plan provided with a cross bar extending between the longer sides of said frame, a tongue-pin pivotally secured to said bar for swinging movements upon one of the end portions of said frame, a hook member formed rigidly integral with said bar and extending from the latter beyond the other end of said frame and spaced from said last mentioned end for receiving a strap therebetween, and a closure tang secured to said bar provided with a resilient portion having an end normally abutting the end of said hook for closing the mouth of the latter.

PETER A. JENSEN.